United States Patent
Peri et al.

(10) Patent No.: US 12,142,058 B2
(45) Date of Patent: Nov. 12, 2024

(54) END-TO-END SYSTEMS AND METHODS FOR STREAMING 3D DETECTION AND FORECASTING FROM LIDAR POINT CLOUDS

(71) Applicant: FORD GLOBAL TECHNOLOGIES, LLC, Dearborn, MI (US)

(72) Inventors: Neehar Peri, Monmouth Junction, NJ (US); Deva K. Ramanan, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 306 days.

(21) Appl. No.: 17/692,973

(22) Filed: Mar. 11, 2022

(65) Prior Publication Data

US 2023/0290153 A1    Sep. 14, 2023

(51) Int. Cl.
   *G06V 20/58* (2022.01)
   *B60W 50/00* (2006.01)
   (Continued)

(52) U.S. Cl.
   CPC ......... *G06V 20/58* (2022.01); *B60W 50/0097* (2013.01); *B60W 60/0027* (2020.02);
   (Continued)

(58) Field of Classification Search
   CPC .............. G06V 20/58; B60W 50/0097; B60W 60/0027; B60W 60/00272;
   (Continued)

(56) References Cited

U.S. PATENT DOCUMENTS

| 10,338,223 B1 | 7/2019 | England et al. |
| 10,401,866 B2 | 9/2019 | Rust |
| (Continued) | | |

FOREIGN PATENT DOCUMENTS

| CN | 112232248 A | 1/2021 |
| JP | 2013186551 A | 9/2013 |
| (Continued) | | |

OTHER PUBLICATIONS

Wu et al., "MotionNet: Joint Perception and Motion Prediction for Autonomous Driving Based on Bird's Eye View Maps", CVF, 2020, pp. 11385-11395.

(Continued)

*Primary Examiner* — Dale W Hilgendorf
(74) *Attorney, Agent, or Firm* — Frank A. MacKenzie; Brooks Kushman, P.C.

(57) ABSTRACT

Disclosed herein are system, method, and computer program product aspects for enabling an autonomous vehicle (AV) to detect objects and forecast their predicted positions. The system can monitor an object within a vicinity of the AV. A plurality of trajectories predicting paths the object will take at a future time can be generated, the plurality of trajectories being based on a generated three-dimensional (3D) point cloud map indicating current and past characteristics of the object. Using a learned model, a forecasted position of the object at an instance in time can be generated along one or more of the plurality of trajectories. A maneuver for the AV can be performed based on the forecasted position.

11 Claims, 9 Drawing Sheets

(51) Int. Cl.
*B60W 60/00* (2020.01)
*G06T 7/20* (2017.01)
*G06T 7/70* (2017.01)
*G06V 10/82* (2022.01)

(52) U.S. Cl.
CPC ......... *B60W 60/00272* (2020.02); *G06T 7/20* (2013.01); *G06T 7/70* (2017.01); *B60W 2420/408* (2024.01); *B60W 2556/10* (2020.02); *B60W 2556/40* (2020.02); *B60W 2556/45* (2020.02); *G06T 2207/10028* (2013.01); *G06T 2207/20084* (2013.01); *G06T 2207/30241* (2013.01); *G06T 2207/30252* (2013.01); *G06T 2207/30261* (2013.01); *G06V 10/82* (2022.01)

(58) Field of Classification Search
CPC ....... B60W 2420/408; B60W 2556/10; B60W 2556/40; B60W 2556/45; G06T 7/20; G06T 7/70; G06T 2207/10028; G06T 2207/20084; G06T 2207/30241; G06T 2207/30252; G06T 2207/30261
See application file for complete search history.

(56) References Cited

U.S. PATENT DOCUMENTS

| | | | |
|---|---|---|---|
| 10,871,779 | B2 | 12/2020 | Templeton et al. |
| 10,909,392 | B1 | 2/2021 | Chaudhuri et al. |
| 11,055,624 | B1* | 7/2021 | Sapp ......................... G06N 7/01 |
| 11,073,601 | B2 | 7/2021 | Nian et al. |
| 2018/0341019 | A1 | 11/2018 | Sakai et al. |
| 2019/0061771 | A1 | 2/2019 | Bier et al. |
| 2019/0086931 | A1* | 3/2019 | Templeton ............ G05D 1/0246 |
| 2019/0113603 | A1 | 4/2019 | Wuthishuwong et al. |
| 2019/0361927 | A1 | 11/2019 | Hampton et al. |
| 2020/0272148 | A1* | 8/2020 | Karasev ................. G01S 13/726 |
| 2020/0309923 | A1 | 10/2020 | Bhaskaran et al. |
| 2020/0377105 | A1* | 12/2020 | Murashkin ............ B60W 40/04 |
| 2021/0011161 | A1 | 1/2021 | Chen et al. |
| 2021/0033706 | A1 | 2/2021 | Funaya |
| 2021/0122364 | A1* | 4/2021 | Lee ........................ G01S 7/4802 |
| 2021/0150230 | A1 | 5/2021 | Smolyanskiy et al. |
| 2021/0201578 | A1* | 7/2021 | Chaudhuri .............. G06T 7/246 |
| 2021/0278523 | A1* | 9/2021 | Urtasun .................. G01S 7/417 |
| 2021/0278539 | A1* | 9/2021 | Laddha ............. B60W 50/0097 |
| 2021/0398338 | A1* | 12/2021 | Philion ................ G06V 10/774 |
| 2023/0057118 | A1* | 2/2023 | Bankiti .................... G01S 17/58 |
| 2023/0202470 | A1* | 6/2023 | Lepird ............... B60W 60/0011 |
| | | | 701/67 |

FOREIGN PATENT DOCUMENTS

| | | |
|---|---|---|
| WO | 2020154970 A1 | 8/2020 |
| WO | 2020154972 A1 | 8/2020 |
| WO | 2020154973 A1 | 8/2020 |
| WO | 2020263397 A1 | 12/2020 |
| WO | 2021056438 A1 | 4/2021 |

OTHER PUBLICATIONS

Chen et al., "3D Point Cloud Processing and Learning for Autonomous Driving", arXiv:2003.00601v1 [cs.CV] Mar. 1, 2020, pp. 1-27.

Fadadu et al., "Multi-View Fusion of Sensor Data for Improved Perception and Prediction in Autonomous Driving", arXiv:2008.11901v1 [cs.CV] Aug. 27, 2020, pp. 1-10.

Luo et al., "Fast and Furious: Real Time End-to-End 3D Detection, Tracking and Motion Forecasting with a Single Convolutional Net", CVF, pp. 3569-3577.

Yin et al., "Center-based 3D Object Detection and Tracking", arXiv:2006.11275v2 [cs.CV] Jan. 6, 2021, pp. 1-12.

International Search Report and Written Opinion in International Application No. PCT/US2023/064123 dated Jul. 11, 2023, 10 pages.

* cited by examiner

END-TO-END SYSTEMS AND METHODS FOR STREAMING 3D DETECTION AND FORECASTING FROM LIDAR POINT CLOUDS

BACKGROUND

Modern day vehicles can be configured to operate in an autonomous mode in which the vehicle navigates through an environment with little or no input from a driver. Such autonomous vehicles can include one or more sensors that detect information about the environment in which the vehicle operates. The vehicle and its associated computer-implemented controller use the detected information to navigate through the environment. For example, if the sensors detect that the vehicle is approaching an obstacle, as determined by the computer-implemented controller, the controller adjusts the vehicle's directional controls to cause the vehicle to navigate around the obstacle.

One such sensor is a light detection and ranging (lidar) device. A lidar device actively detects distances to environmental features while scanning through a scene to assemble a cloud of point positions indicative of the three-dimensional shape of the environmental scene. Individual points are measured by generating a laser pulse and detecting a returning pulse, if any, reflected from an environmental object, and determining the distance to the reflective object according to the time delay between the emitted pulse and the reception of the reflected pulse. The laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. A three-dimensional map of points of reflective features is generated based on the returning pulses for the entire scanning zone. The three-dimensional point map thereby indicates positions of reflective objects in the scanned scene, and may be referred to as a lidar grid as well.

Autonomous vehicle navigation systems, however, still have some challenges. For example, conventional autonomous vehicle navigation systems insufficiently predict the behavior of a detected object in order to determine an intermediate and a future course of action for navigating the autonomous vehicle.

One such challenge resides in managing computational errors in perception stacks. For example, lidar perception outputs can stand alone to provide functional perception, but can also be integrated with the vehicle's existing perception stack at different levels to support various sensor fusion architectures. Current perception stacks have three key components: detection, tracking, and prediction. Using a stack of lidar sweeps as input, standard approaches first detect objects, associate these detections into tracks, and use these tracks to forecast where these objects will be in the future. However, each step of the stack pipeline operates independently, where each step loses information along the way. As such, errors can propagate through the entire pipeline, making the task of forecasting extremely difficult in practice.

Another challenge resides in managing computational and processing bandwidth of an AV computing system. For example, detectors (e.g., lidar based detectors) treat every frame in a sequence of lidar sweeps independently, whereby frames used in a previous forward pass sweep are recalculated. These measurement techniques create large data overlaps due to the reprocessing parts of the lidar sweeps with every frame—leading to significant compute redundancies in the AV computing system.

Improving the projection accuracy of detected objects and the efficiency by which such improvement can be achieved will continue to be a vital component for the success of autonomous vehicle technology and the present systems and methods of this disclosure address the aforementioned problems.

SUMMARY

Aspects of this disclosure are directed to a system and methods that enable AVs to predict detected object trajectories while eliminating the reliance on a tracking phase in data processing of lidar stacks. In aspects, the system can monitor an object within a vicinity of the AV. A plurality of trajectories predicting paths the object will take at a future time can be generated, the plurality of trajectories being based on a generated three-dimensional (3D) point cloud map indicating current and past characteristics of the object. Using a learned model, a forecasted position of the object at an instance in time can be generated along one or more of the plurality of trajectories. A maneuver for the AV can be performed based on the plurality of trajectories.

In aspects, the system can generate a velocity estimate for a current frame in the point cloud map and generate a predicted velocity at the future time. The system can also convert the 3D point cloud to a two-dimensional (2D) birds-eye-view (BEV) representation using a feature extractor (e.g., a Voxel feature extractor) and then generate a heatmap corresponding to a surface density of the 3D point cloud using the 2D-BEV. The system can also generate, with the learned model, two or more forecasted positions of the object based on the heatmap. In one example, the learned model may be a Recurrent Neural Network (RNN) model with a feedforward regression layer. The learned model may also be a Convolutional Neural Network (CNN).

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings are incorporated herein and form a part of the specification.

In the drawings, like reference numbers generally indicate identical or similar elements. Additionally, generally, the leftmost digit(s) of a reference number identifies the drawing in which the reference number first appears.

DETAILED DESCRIPTION

Figure 1:
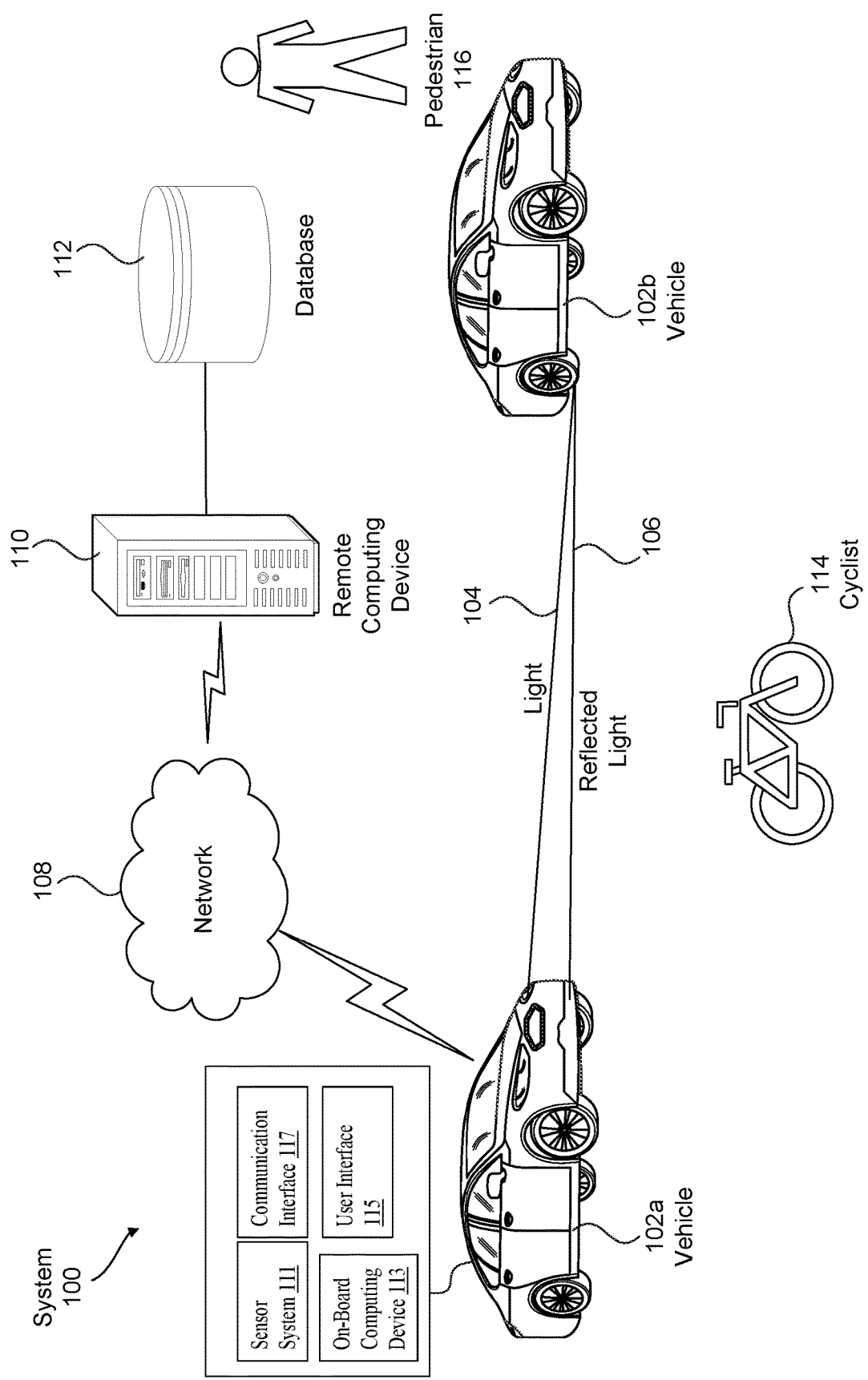
FIG. 1 illustrates an exemplary AV system, in accordance with aspects of the disclosure.

The development and mass production of autonomous vehicles (AVs) has the potential to revolutionize transportation and mobility. AVs combine a variety of sensors to perceive their surroundings, such as radar, lidar, sonar, GPS, odometry and inertial measurement devices. In some aspects, advanced control systems may interpret sensory information to identify appropriate navigation paths, as well as detect obstacles and relevant signage.

One key sensor that AVs rely on is lidar, which relies on systems and methods for determining ranges by targeting an object with a laser and measuring the time for the reflected light to return to the receiver. According to some aspects, lidar may be used to make digital three-dimensional (3D) representations of areas of a perception region (e.g., an area surrounding the AV). Within the 3D representations (also known as lidar grids or point clouds), a lidar computing system, or an on-board computing device (such as computing device 220 discussed herein below) may detect a moving object within the perception region, may generate one or more possible object trajectories for the detected object and the AV, and may analyze the possible object trajectories to forecast the detected object's position at future time intervals.

As noted herein, two primary challenges reside with existing systems that are addressed by the present disclosure. The first challenge is the existence of computational errors in perception stacks and how to best reduce these errors. For example, lidar perception outputs can stand alone to provide functional perception (e.g., detection), but can also be integrated with the vehicle's existing perception stack at different levels to support various sensor fusion architectures. Current perception stacks have three key components: detection, tracking, and prediction. Using a stack of lidar sweeps as input, standard approaches first detect objects, associate these detections into tracks, and use these tracks to forecast where these objects will be in the future. However, each step of the stack pipeline operates independently, where each step loses information along the way. As such, errors can propagate through the entire pipeline, making the task of forecasting extremely difficult in practice and error prone. According to aspects of the disclosure, the tracking module is removed, and a lidar sensor is provided that can enable detection and prediction (e.g., forecasting) computations without the need for performing a separate tracking stack. Such sensor and processing techniques reduce the error generated by the tracking module within the perception stack. Examples of such errors generated by the tracking module may include lossy data, noise, and inaccuracies relating to occluded (or partially occluded) objects that may fade in and out of perception tracking. By eliminating reliance on a separate tracking module within the perception stack, the AV system can generate improved predictions of detected object that require less computation bandwidth (e.g., less perception stack steps) and introduce less errors in the pipeline, as will be further illustrated with FIGS. 4A and 4B.

The second challenge residing within existing systems is managing (e.g., improving) computational and processing bandwidth of an AV computing system. Initially, by eliminating a separate tracking step from the stack pipeline, computational and processing bandwidth of an AV computing system is improved. Moreover, the present disclosure provides for additional improvements in computational and processing capabilities of an AV computing system by reducing computational redundancies generated by processing of consecutive lidar sweeps. For example, detectors (e.g., lidar based detectors) treat every frame in a sequence of lidar sweeps independently, whereby frames used in a previous forward pass sweep are recalculated. These measurement techniques create large data overlaps due to the reprocessing parts of the lidar sweeps with every frame—leading to significant compute redundancies in the AV computing system. The present disclosure presents systems and methodologies that reduce such redundancies by processing portions of subsequent sweep frames (as opposed to entire sweep frames)—thereby significantly reducing processing time.

The benefits provided by the embodiments discussed herein decrease processing time and bandwidth, and can further enable on-board computing device 220 to process faster object trajectories generated by the lidar sensor (e.g., lidar 264). This is especially important for AVs operating in the field, where faster detection and decision-making capabilities (due to decreased processing time and increased bandwidth) can help an AV generate and execute faster navigation-based decisions, thereby resulting in improved safety and operation of the AV. As also noted herein, the reduction of processing time and bandwidth also improves power consumption, thereby increasing a total range of a battery operated AV for example.

Provided herein are system, apparatus, device, method and/or computer program product aspects, and/or combinations and sub-combinations thereof, for enabling AVs to deal with certain road conditions that may pose a risk to the AV. Specifically, the system can allow an AV to react to objects that potentially pose a risk to the AV. The system is unique from conventional system in that, rather than forecast positions of objects that may pose a risk to the AV and wait to see if its predictions are validated, the system forecasts positions of objects and computes error values indicating whether the forecasted positions are likely to be reliable. This may be done in real-time. This identification of errors in prediction forecasts on-the-fly enables motion planning to treat error-prone forecasts with more caution and enables an AV to use this information to adjust and improve predicted trajectories to avoid and/or react to objects. The error values can indicate to the AV at what level of confidence its prediction forecasts for the object are reliable and based on the same they can allow the AV to react to the object.

The term "vehicle" refers to any moving form of conveyance that is capable of carrying either one or more human occupants and/or cargo and is powered by any form of energy. The term "vehicle" includes, but is not limited to, cars, trucks, vans, trains, AVs, aircraft, aerial drones and the like. An AV is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an AV. However, the present solution is not limited to AV applications. The present solution may be used in other applications such as robotic applications, radar system applications, metric applications, and/or system performance applications.

FIG. 1 illustrates an exemplary AV system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, or 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. AV 102a may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
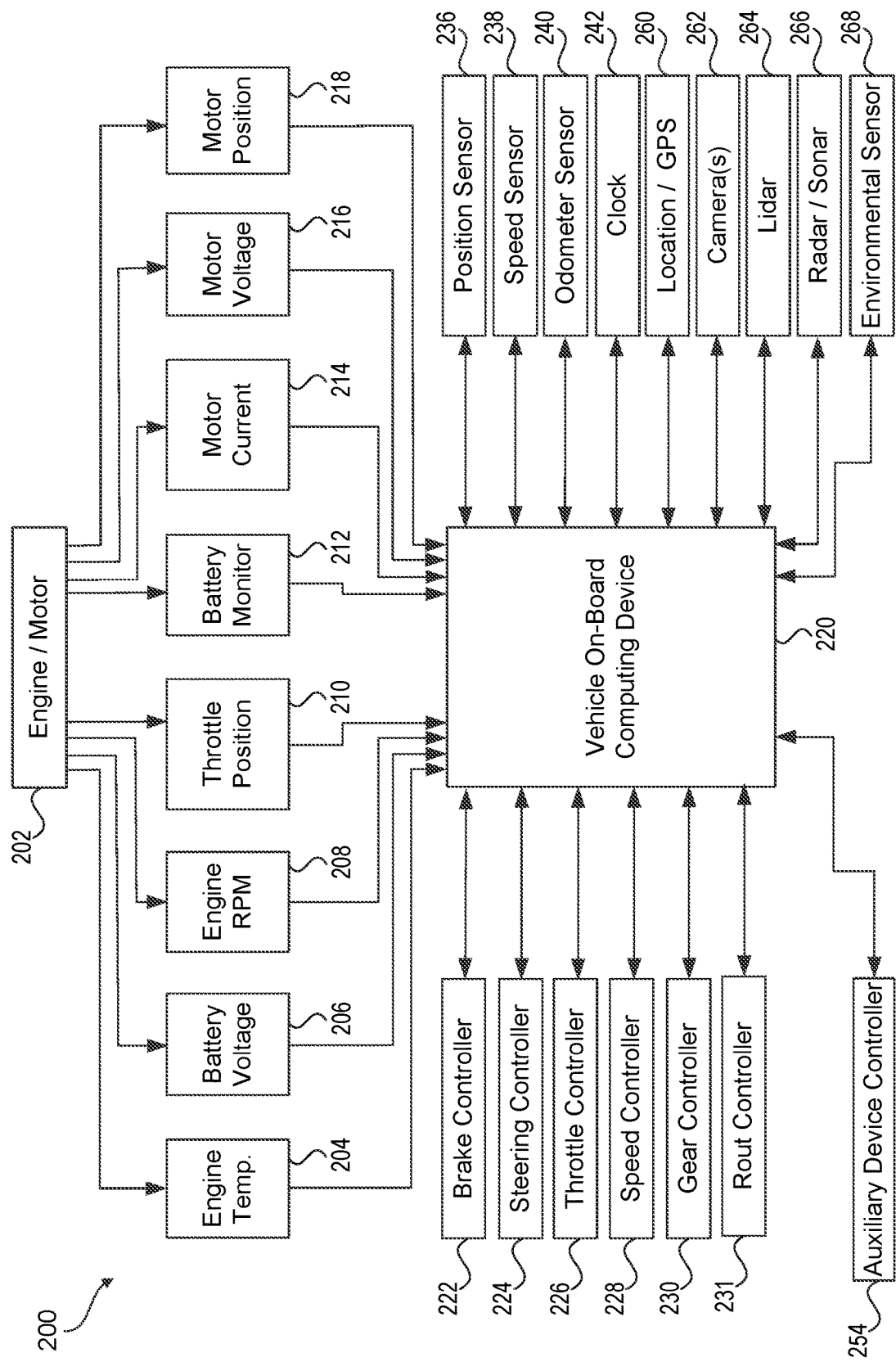
FIG. 2 illustrates an exemplary architecture for an AV, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some aspects, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., a cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases, etc. The communications interface 117 may utilize any now or hereafter known protocols, protection schemes, encodings, formats, packaging, etc. such as, without limitation, Wi-Fi, an infrared link, BLUETOOTH-link, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a and 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System (GPS) device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of AV 102a or 102b of FIG. 1, in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 8. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the AV 102a or 102b. Any known or to be known technique for making an object detection based on sensor data and/or captured images may be used in the aspects disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the AV 102a or 102b. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an AV 102a. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various aspects, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or radar data, camera images, etc.) in order to identify objects and/or features in the environment of AV 102a. The objects may include traffic signals, roadway boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some aspects, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to entering the intersection.

In various aspects, the on-board computing device 220 may determine a motion plan for the AV 102a. For example, the on-board computing device 220 may determine a motion plan for the AV 102a based on the perception data and/or the prediction data. Specifically, given predictions about the future locations of proximate objects and other perception data, the on-board computing device 220 can determine a motion plan for the AV 102a that best navigates the AV 102a relative to the objects at their future locations.

In some aspects, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the AV 102a, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision may be avoided if the AV 102a follows a defined vehicle trajectory and/or implements one or more dynamically generated emergency maneuvers performed in a pre-defined time period (e.g., N milliseconds). If the collision may be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed herein, planning and control data regarding the movement of the AV 102a is generated for execution. The on-board computing device 220 may, for example, control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Figure 3:
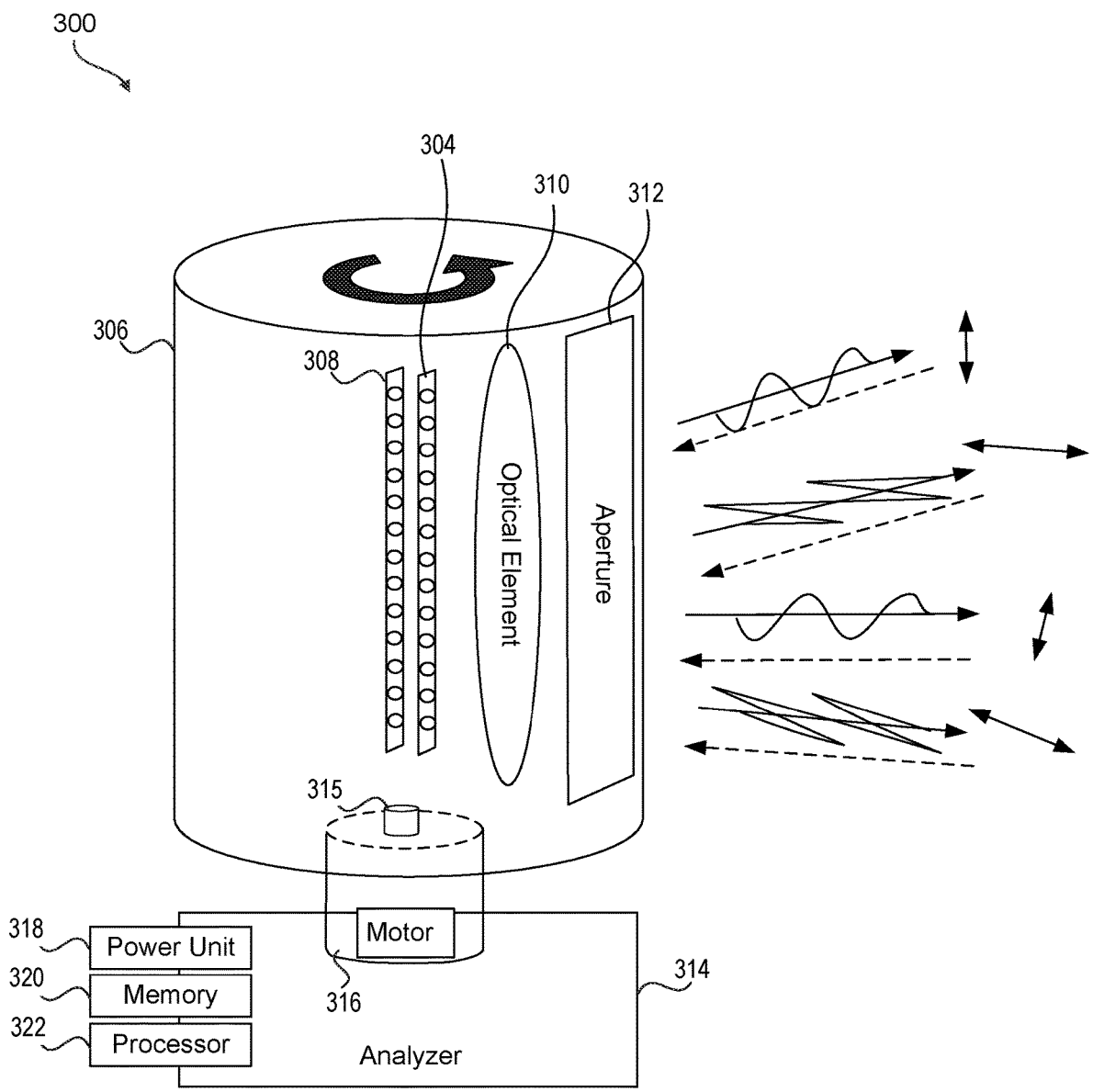
FIG. 3 illustrates an exemplary architecture for a lidar system, in accordance with aspects of the disclosure.

FIG. 3 illustrates an exemplary architecture for a lidar system 300, in accordance with aspects of the disclosure. lidar system 264 of FIG. 2 may be the same as or substantially similar to the lidar system 300. As such, the discussion of lidar system 300 is sufficient for understanding lidar system 264 of FIG. 2.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310. It can be appreciated that the mechanical lidar system described herein is but an example lidar system relied on by aspects of the present solution and that other examples of lidar systems, such as solid state lidar systems may also be implemented.

One or more optical element structures 310 may be positioned in front of a mirror (not shown) to focus and direct light that is passed through the optical element structure 310. As shown below, the system includes an optical element structure 310 positioned in front of a mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

According to some aspects, lidar system 300 may generate and provide an output to a vehicle on-board computing system (e.g., on board computing device 220). Such output may include a three dimensional (3-D) mapping of a perception region (an area illuminated by lidar 264 or lidar 300). According to some aspects the three dimensional mapping may also be referred to as the lidar grid, where grid cells may each provide a proportional representation of the perception region. When an object is detected within the lidar grid, on-board computing device 220 may attempt to estimate a velocity of the object to generate a collision threat assessment and potential navigation instructions to other AV systems. Accordingly, the systems and methods for detecting and forecasting object trajectories are described herein with regard to FIGS. 4-8 below.

Figure 4A:
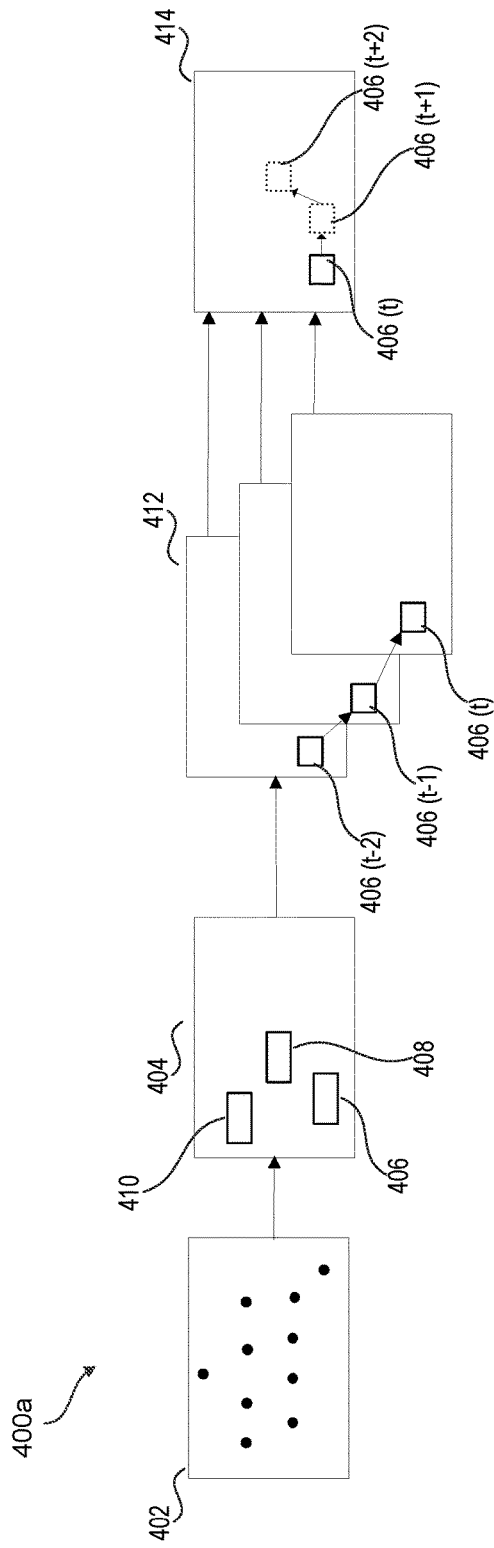
FIGS. 4A-4C illustrate lidar stack processing techniques, in accordance with aspects of the disclosure.
Figure 4B:
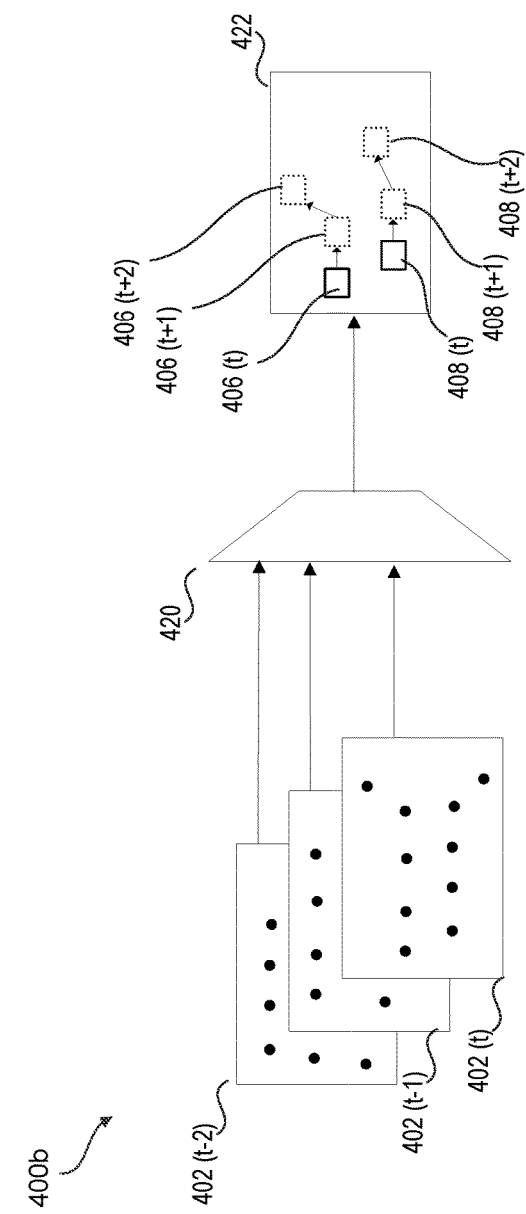
Figure 4C:
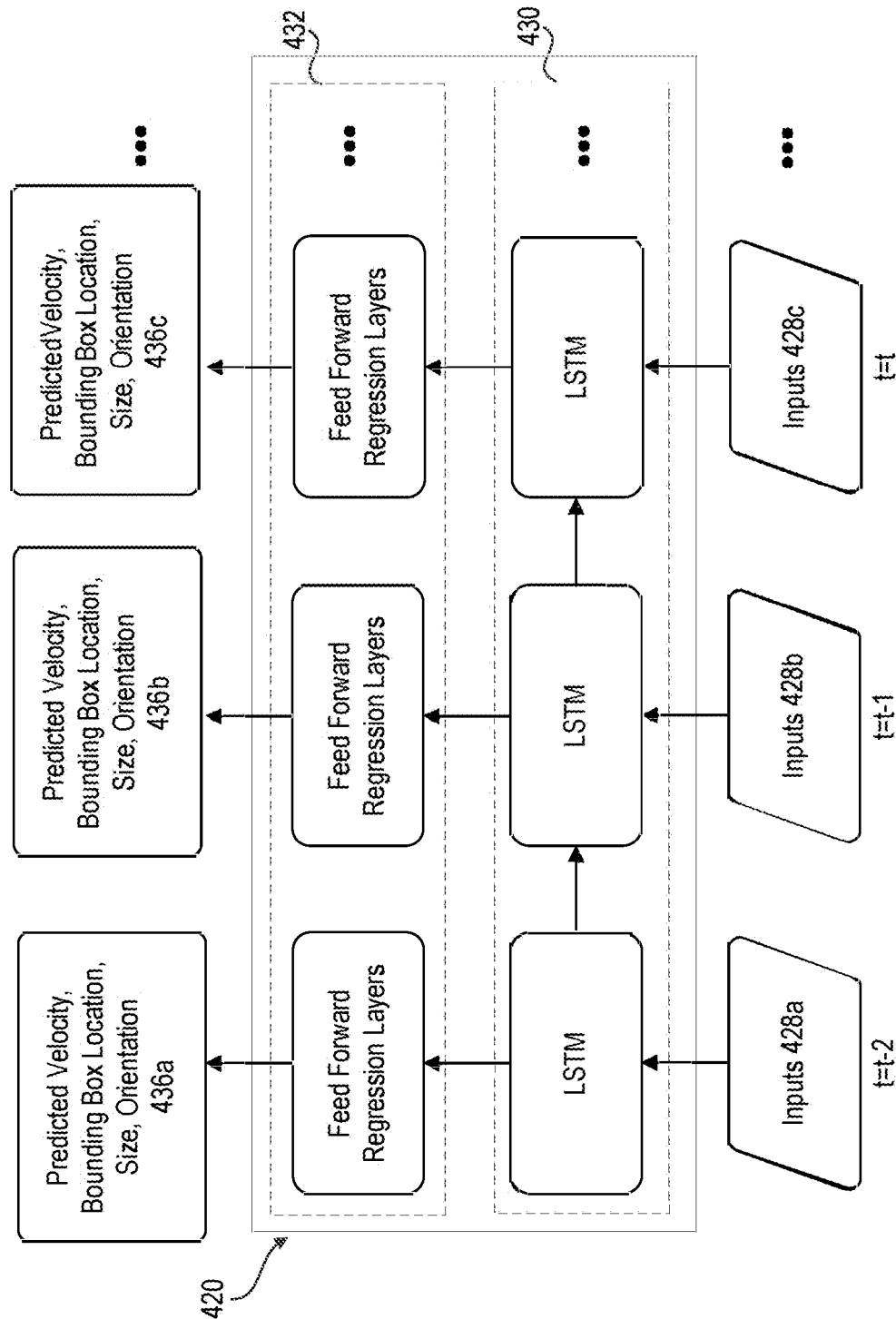

FIGS. 4A, 4B, and 4C represent detection and prediction operations according to some embodiments. FIG. 4A illustrates current methodologies for processing lidar stacks as represented in system 400a. For example, system 400a generates one or more 3D point clouds 402 from one or more lidar sweeps. Point clouds 402 may represent detected points of interest. Once the 3D point cloud is generated, a detector 404 may then attempt to classify the points of interest into detected objects as illustrated by detected object boxes 406, 408, and 410. It can be appreciated that the detected objects may be any object within the AV's environment, including, for example, a pedestrian (e.g., pedestrian 116), a vehicle (e.g., vehicle 102b), a cyclist (e.g., cyclist 114), a road sign, or any other object that can be found in an AV's environment. System 400a may further include a tracker 412 that tracks the movement of detected object boxes 406 at predetermined time intervals. For example, tracker 412 may track and record detected movement of object box 406 for historical time stamps (e.g., 406 (t−2) and 406 (t−1)) as well as present time stamps (e.g., 406(t)). It can be appreciated that time stamp t−2 is but one example, and those skilled in the art may appreciate that any time interval (n) spanning different time stamps may be implemented based on specific design parameters.

After tracking of the detected object boxes, system 400a may then use predictor 414 to predict or forecast future positions of the detected object boxes. For example, predictor 414 may forecast estimated future positions for detected object box 406 at time stamps (t+1) and (t+2). As noted herein, the lidar stack pipeline introduces potential calculation errors at each stage of the pipeline (e.g., detection, tracking, and prediction) where an accumulated error can be compounded from stage to stage—thereby significantly affecting prediction accuracies. Moreover, each stage of the lidar stack requires significant processing bandwidth.

FIGS. 4B and 4C present methodologies that reduce the error and processing costs by removing the requirement for a tracker in the lidar stack. As illustrated in FIG. 4B, system 400b includes a lidar system that performs one or more lidar sweeps generating one or more 3D point clouds 402 at different time stamps (e.g., t−2, t−1, and t). As an alternative to the tracker shown in FIG. 4A, the lidar of system 400b may be trained by a training model 420 (described herein w/r to FIG. 4C) that can enable the lidar to generate track data. A tracker 422, similar to tracker 414, can use the data output from the lidar to forecast future positions of detected object boxes 406 and 408 at future time intervals (e.g., t+1, t+2, etc.). It can be appreciated that learned model 420 may be run on processor 322 of lidar system 300.

FIG. 4C is an example architecture of the learned model 420 used by the lidar system 300, in accordance with aspects of the disclosure. The learned model 420 shown in FIG. 4C comprises long-short term memory (LSTM) models 430 in combination with feedforward regression layers 432 of a RNN that can compute a forecast velocity for an observed object at instances in time. It can be appreciated that the learned model 420 can also compute size and orientation of detected objects as well as a predicted bounding box location for each detected object. Such factors may be relied on when defining/predicting the future position for each detected object. Other architectures may be used to implement the learned model 420, including different implementations based on RNNs. As shown in FIG. 4C, the inputs to the learned model 420 are inputs 428 at each of the instances in time. The predicted velocities for each time instance {t=t−2, t=t−1, t=t} are shown as {436a, 436b, 436c}. The inputs for each time instance is shown as {428a, 428b, 428c}. The time instances can go on for any number of instances. Three instances are shown in FIG. 4C for simplicity.

In aspects, the learned model 420 functions by receiving the inputs 428 at each time at each of the LSTM models 430. The LSTM models 430 can generate derived features or values representing the forecasted position of the object based on the inputs 428. The derived features refer to vectors of real numbers for each object at each time cycle. In aspects, the derived features can comprise vectors of 512 real numbers for each object at each time cycle. In aspects, these derived features are then fed into regression layers 432, which can generate the predicted velocity values {436a, 436b, 436c} at each time instance. Based on the predicted velocity determined over the time periods, a forecast position of the detected object may be predicted.

In aspects, the learned model 420 shown in FIG. 4C may be trained and optimized to generate predicted velocities using a gradient descent algorithm, such as a stochastic gradient descent approach based on detections for observed object behavior. The advantage of using the architecture shown in FIG. 4C is that it has been observed to produce more accurate predictions by reducing the need for a separate tracker in the lidar stack. The added benefit of utilizing the architecture of FIG. 4C is that because the LSTM models 430 account for history, lagged features (for example, a last observed velocity) do not have to be separately tracked and input as a specific input because the LSTM models 430 will track the last observed velocities.

Figure 5:
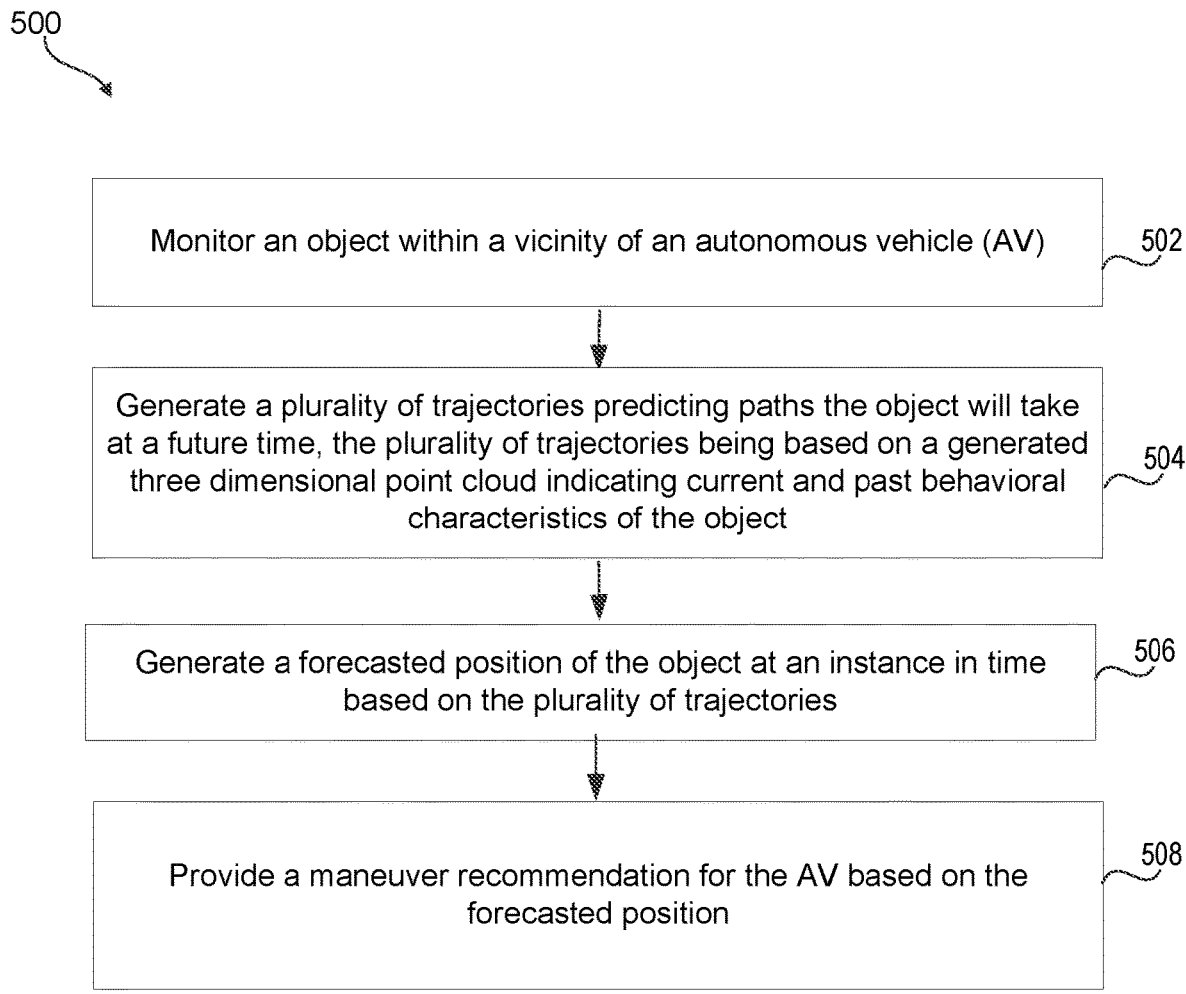
FIG. 5 illustrates an exemplary method for generating forecast position of a detected object, in accordance with aspects of the disclosure.

FIG. 5 illustrates an exemplary method 500 for generating forecast position of a detected object, in accordance with aspects of the disclosure. According to some aspects, method 500 may include monitoring an object within a vicinity of the AV, as illustrated in step 502. As can be appreciated, monitoring of an object may be performed with the AVs sensor suite, including, for example, lidar system 300. Such monitoring may comprise generating one or more lidar sweeps and processing data generated by the sweeps according.

According to some aspects, method 500 may further include generating a plurality of trajectories predicting paths the object will take at a future time, as illustrated in step 504. In one example, the plurality of trajectories may be based on a generated 3D point cloud (from the lidar sweeps) indicating current and past behavioral characteristics of the object. Such behavioral characteristics may be detected locations and velocities of the object at different time stamps (e.g., t−2, t−1, t) as shown in FIG. 4B. Unlike prior systems, and as illustrated in FIG. 4C, the trajectories may be generated directly from the lidar's output using the learned model described therein—thereby foregoing and computational cost and eliminating any errors introduced during tracking operations of a generic lidar stack.

According to some aspects, method 500 further includes generating a forecast position of the object at a future instance in time (e.g., t+1, t+2), as illustrated in step 506 and also as illustrated in FIG. 4B. The forecasting operations may be generated by a forecaster that takes, as input, the output predicted velocities from the lidar system/learned model.

According to some aspects, method 500 may further include providing a maneuver recommendation for the AV based on the forecasted position, as illustrated in step 508.

It can be appreciated that in order to generate a forecasted position, method 500 may further implement processes described in FIGS. 4B and 4C. For example, to generate the forecasted position of the object, method 500 may utilize the learned model of FIG. 4C to generate a velocity estimate for a current frame in the point cloud (e.g., input 428) and subsequently generating a predicted velocity at a future time interval (e.g., predicted velocity 436). Learned model 420 may also be used to convert the generated 3D point cloud to a two dimensional birds-eye-view (2D-BEV) representation using a feature extractor (e.g., a Voxel feature extractor or the like). Since point clouds tend to be sparse (wherein most regions of a 3D space may be without measurements), this conversion reduces the complexity of the detection and further reduces computational costs. For example, the conversion to 2D-BEV more promptly enables the detection of object boxes and can enable the learned model to perform the required regressions at a faster pace (rather than processing an entire 3D point cloud).

Based on the 2D-BEV, method 500 may further include generating a lidar heatmap corresponding to a surface density of the 3D point cloud. This step further simplifies the detection process by further highlighting detected objects for the learned model to detect and track. For example, using the heatmap, the learned model may be used to generate two or more forecasted velocities of the object and then generate two or more forecasted positions of the object. It can be appreciated that while the description of the forecasted positions is described with context of the learned model, the generation of the forecasted position may also be performed by a forecaster in the lidar stack that resides either within lidar 300 or vehicle on-board computing device 220.

Figure 6:
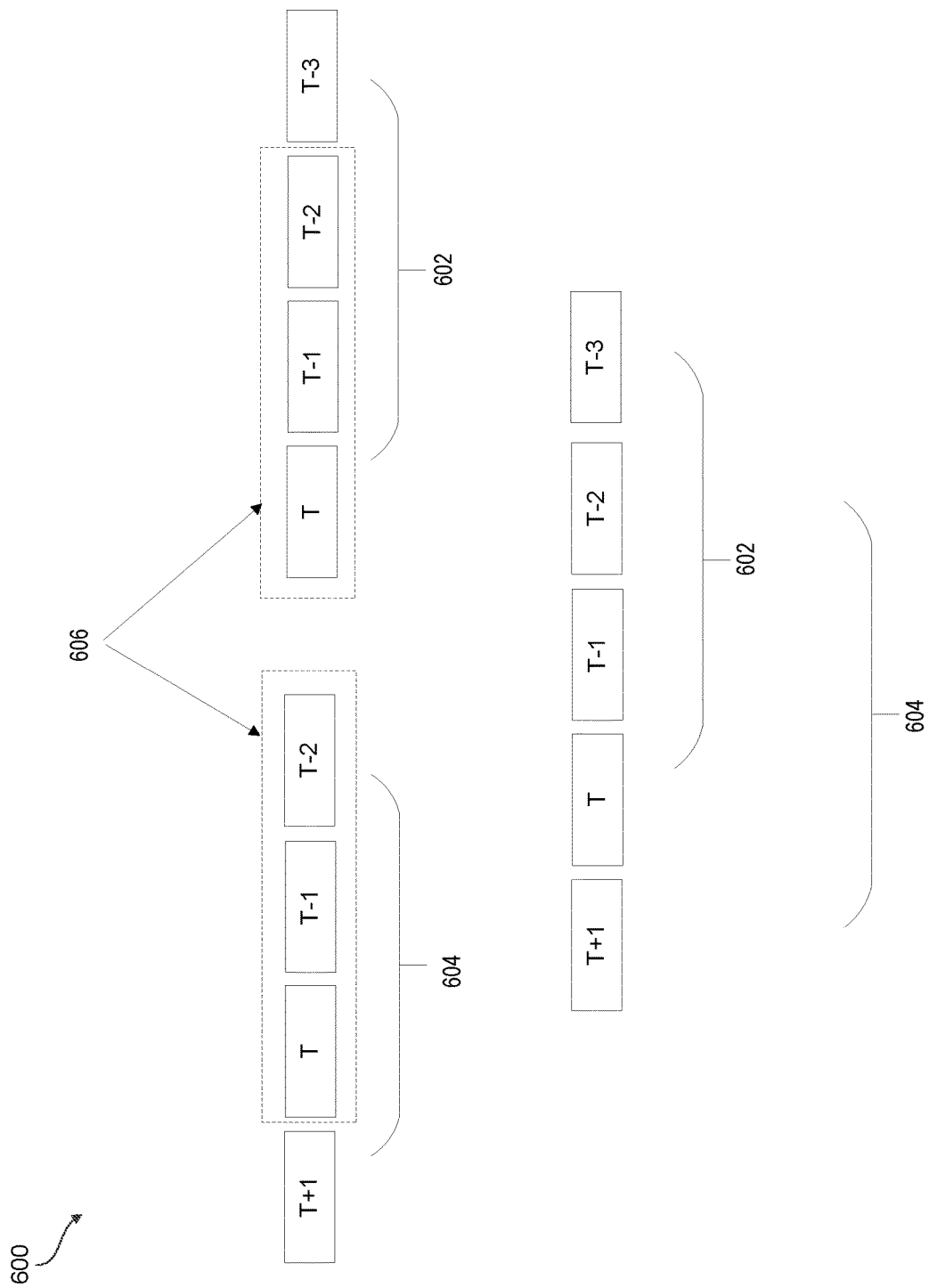
FIG. 6 illustrates two consecutive lidar sweep frames, in accordance with aspects of the disclosure.
Figure 7:
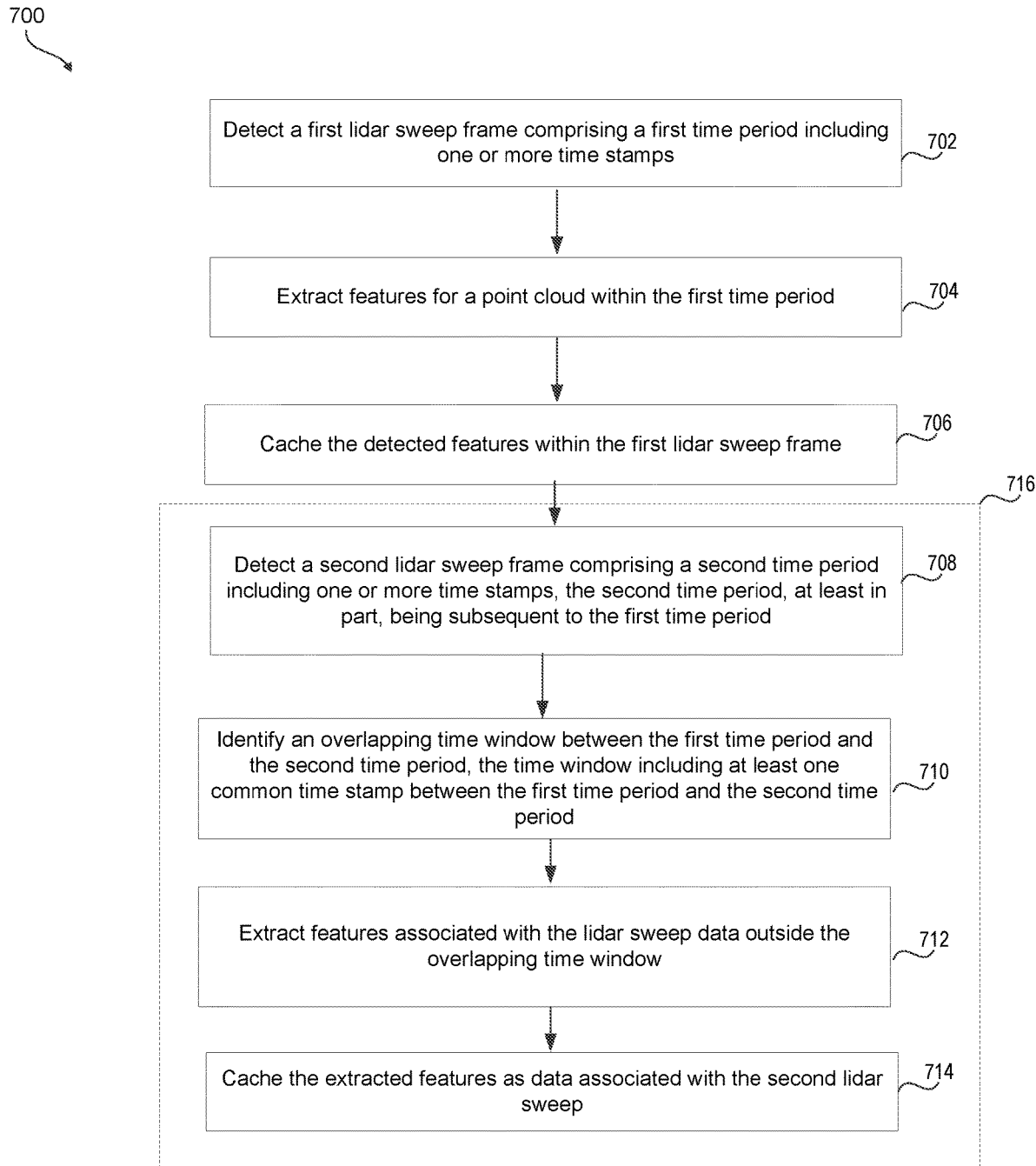
FIG. 7 illustrates an exemplary method for processing the two consecutive lidar sweep frames while reducing processing redundancies, in accordance with aspects of the disclosure.

FIG. 6 illustrates an two consecutive lidar sweep frames (lidar sweep frames example 600), in accordance with aspects of the disclosure. FIG. 7, described further below, illustrates an exemplary method for processing the two consecutive lidar sweep frames while reducing processing redundancies, in accordance with aspects of the disclosure.

As described herein, there is a current challenge residing within existing systems, which is managing (e.g., improving) computational and processing bandwidth of an AV computing system. Initially, with reference to FIGS. 4A-4C, and FIG. 5, by eliminating a separate tracking step from the stack pipeline, computational and processing bandwidth of an AV computing system are improved. Moreover, the present disclosure provides for additional improvements in computational and processing capabilities of an AV computing system (e.g., lidar processor 322 and/or on-board computing device 220) by reducing computational redundancies generated when processing consecutive lidar sweep frames (e.g., frames 602 and 604). For example, detectors (e.g., lidar based detectors) treat every frame in a sequence of lidar sweeps independently (e.g., frames 602 and 604), whereby frames used in a previous forward pass sweep are recalculated (e.g., window 606 including common overlapping frame components T−2, T−1, and T).

The existing measurement techniques create large data overlaps due to the reprocessing parts of the lidar sweeps with every frame—leading to significant compute redundancies in the AV computing system. The present disclosure presents systems and methodologies that reduce such redundancies by processing portions of subsequent sweep frames (as opposed to entire sweep frames)—thereby significantly reducing processing cost and time.

FIG. 7 illustrates an exemplary method 700 for processing two consecutive lidar sweep frames (e.g., 602 and 604) while reducing processing redundancies, in accordance with aspects of the disclosure. According to some aspects, method 700 may include processing a first lidar sweep frame comprising a first time period including one or more time stamps (e.g., frame 602), as illustrated in step 702. Subsequently, a 3D point cloud may be generated in accordance with the descriptions of the present disclosure.

According to some aspects, method 700 may include extracting features associated with the first time period from the 3D point cloud, as illustrated in step 704. It can be appreciated that feature extraction may include detected object box representing a detected object. According to some aspects, method 700 may further include caching the extracted features as objects associated with the first lidar sweep, as illustrated in step 706. In this regard, the AV will know at this stage what objects are detected with the first lidar sweep.

According to some aspects, method 700 may further include detecting a second lidar sweep frame comprising a second time period including one or more time stamps, the second time period, at least in part, being subsequent to the first time period (e.g., frame 604 including some common time stamps T−2, T−1, and T), as illustrated in step 708. According to some aspects, method may include processing the second lidar sweep. Such processing may include, for example, identifying an overlapping time window (e.g., 606) between the first time period and the second time period, the overlapping time window including at least one common time stamp between the first time period and the second time period (e.g., T−2, T−1, and T), as illustrated in step 710.

According to some aspects, method 700 may further include extracting features associated with lidar sweep frame data outside the overlapping time window, as illustrated in step 712. For example, for frame 604, instead of processing the entire frame (e.g., T−2, T−1, T, T+1), lidar processor 322 (or on-board computing device 220) may only process and extract features associated with time stamps outside the window 606 (e.g., T+1).

According to some aspects, method 700 may further include caching the extracted features as data associated with the second lidar sweep (e.g., 604), as illustrated in step 714. It can be appreciated that steps 708-714 may deploy a sliding window approach whereby such window identifies common time stamps of each subsequent frame as portions already processed and only processing new portions of the frame outside the sliding window. Steps 708-714 may be designated by combined operation 716.

The systems and methods implementing functions described with respect to FIGS. 4-7, may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 200 or installed as a removable portion of the system 200.

The system 200 described above improves the state of the art from conventional systems because it provides a novel way to have AV 102a deal track and predict positions of objects that may pose a risk to the AV 102a. The system 200 is unique from conventional system in that, rather than forecast positions of objects that may pose a risk to the AV 102*a* through a generic lidar stack, the system 200 forecasts positions of objects and computes velocities associated with those objects from lidar generated point clouds. This eliminates at least the tracking module in the lidar stack pipeline—thereby reducing associated data/computational errors associated with the module. Moreover, this approach also simplifies calculations, thereby reducing processing costs. As described herein with reference to FIGS. 6 and 7, processing costs can be further reduced by the manner in which subsequent lidar sweep frames are processed. Such processing eliminates compute redundancies—thereby improving computational bandwidth and reducing computational costs. Such improvements are compounded when an AV 102*a* is navigating a course, in real time, and improvements in computational bandwidth can lead to improved processing and reaction times.

Figure 8:
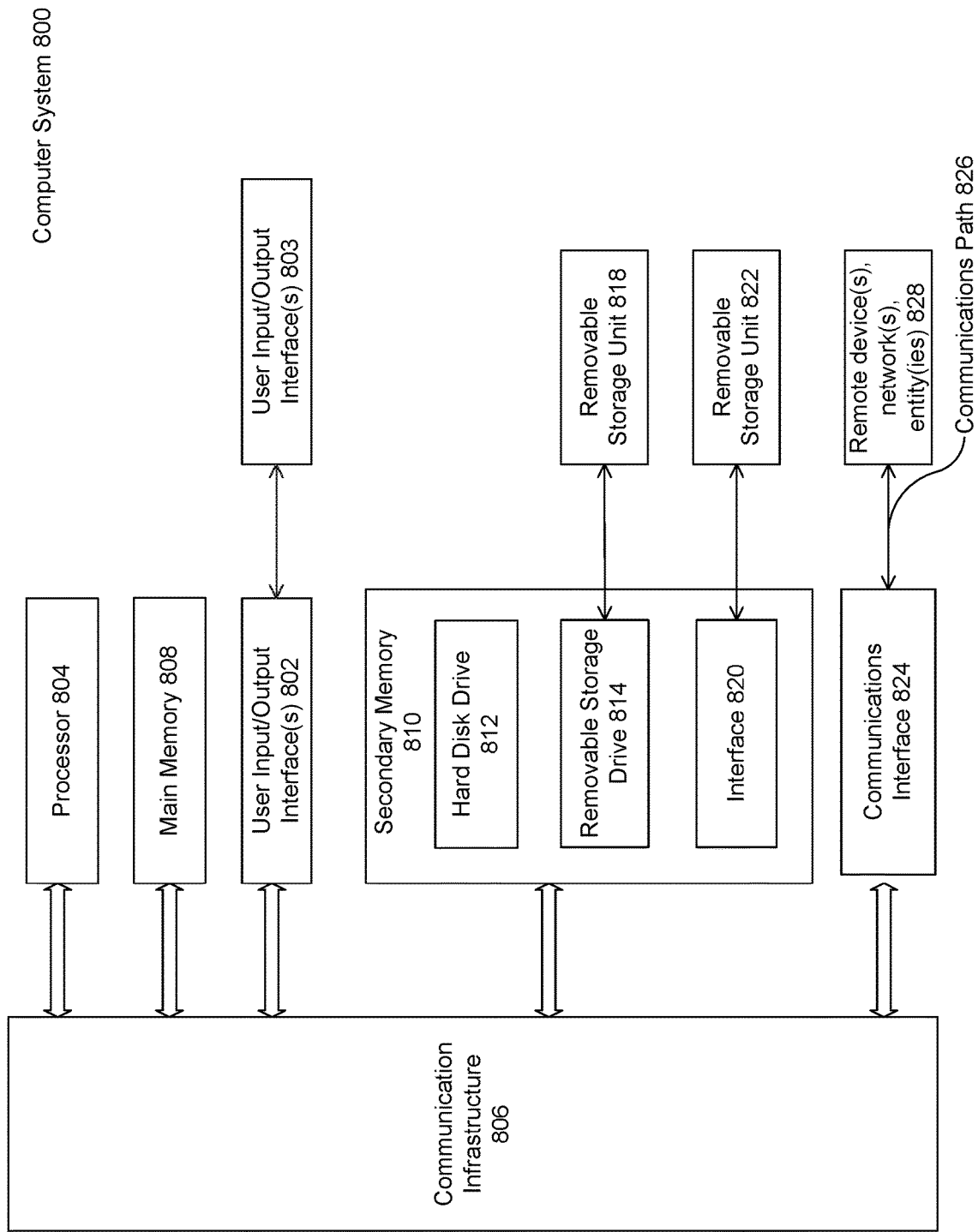
FIG. 8 is an example computer system useful for implementing various aspects, in accordance with aspects of the disclosure.

FIG. 8 is an example computer system 800 useful for implementing system 300, in accordance with aspects of the disclosure. Computer system 800 may be any computer capable of performing the functions described herein. The on-board computing device 220 of FIG. 2 may be implemented using components of the computing system 800.

Computer system 800 includes one or more processors (also called central processing units, or CPUs), such as a processor 804. Processor 804 is connected to a communication infrastructure or bus 806.

Processor 804 may include one or more processors 804 and may each be a graphics processing unit (GPU). In an aspect, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary aspect, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an aspect, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 8. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects may be described using the expression "coupled" and "connected" along with their derivatives. These terms are not necessarily intended as synonyms for each other. For example, some aspects may be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer implemented method comprising:
monitoring, by one or more computing devices of an autonomous vehicle (AV), an object within a vicinity of the AV;
generating, by the one or more computing devices, a plurality of trajectories predicting paths the object will take at a future time, the plurality of trajectories being based on a generated three-dimensional (3D) point cloud map indicating current and past characteristics of the object;
generating, by the one or more computing devices and with a learned model, a forecasted position of the object at an instance in time along one or more of the plurality of trajectories, the forecasted position being generated by:
generating a velocity estimate for a current frame in the 3D point cloud map; and
generating a predicted velocity at the future time, the predicted velocity being generated by:
converting the 3D point cloud map to a two-dimensional (2D) birds-eye-view (BEV) representation using a feature extractor;
generating, using the 2D-BEV representation, a lidar heatmap corresponding to a surface density of the 3D point cloud map; and
generating, with the learned model, two or more forecasted positions of the object based on the lidar heatmap, the learned model being a Recurrent Neural Network (RNN) model with a feed-forward regression layer; and
providing, by the one or more computing devices, a maneuver recommendation for the AV based on the forecasted position.

2. The method of claim 1, further comprising:
processing a first lidar sweep frame comprising a first time period including one or more time stamps;
generating the 3D point cloud map;
extracting features associated with the first time period from the 3D point cloud map; and
caching the extracted features as objects associated with the first lidar sweep frame.

3. The method of claim 2, further comprising,
detecting a second lidar sweep frame comprising a second time period including one or more time stamps, the second time period, at least in part, being subsequent to the first time period.

4. The method of claim 3, further comprising:
identifying an overlapping time window between the first time period and the second time period, the overlapping time window including at least one common time stamp between the first time period and the second time period;
extracting features associated with lidar sweep frame data outside the overlapping time window; and
caching the extracted features as data associated with the second lidar sweep frame.

5. A non-transitory computer readable medium including instructions for causing one or more processors to perform operations comprising:
monitoring, by one or more computing devices of an autonomous vehicle (AV), an object within a vicinity of the AV;
processing a first lidar sweep frame comprising a first time period including one or more time stamps;
detecting a second lidar sweep frame comprising a second time period including one or more time stamps, the second time period, at least in part, being subsequent to the first time period;
generating a three-dimensional (3D) point cloud map using the first lidar sweep frame and the second lidar sweep frame;
identifying an overlapping time window between the first time period and the second time period, the overlapping time window including at least one common time stamp between the first time period and the second time period;
extracting features associated with the first time period from the 3D point cloud map;
caching the extracted features associated with the first time period from the 3D point cloud map as objects associated with the first lidar sweep frame;
extracting features associated with lidar sweep frame data outside the overlapping time window;
caching the extracted features associated with the lidar sweep frame data outside the overlapping time window as data associated with the second lidar sweep frame;
generating, by the one or more computing devices, a plurality of trajectories predicting paths the object will take at a future time, the plurality of trajectories being based the 3D point cloud map indicating current and past characteristics of the object;
generating, by the one or more computing devices and with a learned model, a forecasted position of the object at an instance in time along one or more of the plurality of trajectories; and
providing, by the one or more computing devices, a maneuver recommendation for the AV based on the forecasted position.

6. The non-transitory computer readable medium of claim 5, wherein the generating of the forecasted position of the object with the learned model comprises:
generating a velocity estimate for a current frame in the 3D point cloud map; and generating a predicted velocity at the future time.

7. The non-transitory computer readable medium of claim 6, wherein generating the predicted velocity further comprises:

converting the 3D point cloud map to a two-dimensional (2D) birds-eye-view (BEV) representation using a feature extractor.

8. The non-transitory computer readable medium of claim 7, wherein generating the predicted velocity further comprises:
generating, using the 2D-BEV representation, a lidar heatmap corresponding to a surface density of the 3D point cloud map; and
generating, with the learned model, two or more forecasted positions of the object based on the lidar heatmap, the learned model being a Recurrent Neural Network (RNN) model with a feedforward regression layer.

9. A computing system comprising:
a memory of an autonomous vehicle (AV) configured to store instructions;
a processor of the AV, coupled to the memory, configured to process the stored instructions to:
monitor an object within a vicinity of the AV;
generate a plurality of trajectories predicting paths the object will take at a future time, the plurality of trajectories being based on a generated three-dimensional (3D) point cloud map indicating current and past characteristics of the object;
generate a velocity estimate for a current frame in the 3D point cloud map;
generate a predicted velocity at the future time;
convert the 3D point cloud map to a two-dimensional (2D) birds-eye-view BEV) representation using a feature extractor;
generate, using the 2D-BEV representation, a heatmap corresponding to a surface density of the 3D point cloud map;
generate, using a learned model, a forecasted position of the object at an instance in time along one or more of the plurality of trajectories;
generate, with the learned model, two or more forecasted positions of the object based on the heatmap, the learned model being a Recurrent Neural Network (RNN) model with a feedforward regression layer; and
provide a maneuver recommendation for the AV based on the forecasted position.

10. The computing system of claim 9, wherein the processor is further configured to:
process a first lidar sweep frame comprising a first time period including one or more time stamps;
generate the 3D point cloud map;
extract features associated with the first time period from the 3D point cloud map; and
cache the extracted features as objects associated with the first lidar sweep frame.

11. The computing system of claim 10, wherein the processor is further configured to:
detect a second lidar sweep frame comprising a second time period including one or more time stamps, the second time period, at least in part, being subsequent to the first time period; and
process the second lidar sweep frame by:
identifying an overlapping time window between the first time period and the second time period, the overlapping time window including at least one common time stamp between the first time period and the second time period,
extracting features associated with lidar sweep frame data outside the overlapping time window, and
caching the extracted features as data associated with the second lidar sweep frame.

* * * * *